United States Patent [19]
Alter et al.

[11] 3,783,292
[45] Jan. 1, 1974

[54] ALPHA PARTICLE DOSIMETER

[75] Inventors: Henry Ward Alter, Danville; Daniel B. Lovett, Dublin, both of Calif.

[73] Assignee: General Electric Company, San Jose, Calif.

[22] Filed: July 16, 1971

[21] Appl. No.: 163,150

[52] U.S. Cl............................ 250/83 CD, 250/83 R
[51] Int. Cl............................ G01t 5/00, G01t 5/10
[58] Field of Search................. 250/83 CD, 83 PH, 250/83 R

[56] References Cited
UNITED STATES PATENTS
3,283,153  11/1966  Geiger........................... 250/83 PH
3,505,523  4/1970   Becker.......................... 250/83 CD
3,614,421  10/1971  Alter et al.................... 250/83 CD X

*Primary Examiner*—Archie R. Borchelt
*Attorney*—Ivor J. James, Jr. et al.

[57] ABSTRACT

A dosimeter for recording alpha particles using track-registration material is disclosed. The dosimeter consists of a housing and an insert means holding the track-registration material. The dosimeter can be secured to a hat worn by a person working in an environment to be monitored, such as a uranium mine, which may contain quantities of radon gas and radon daughter products. The insert means is easily secured to and removed from the housing. The dosimeter is exceptionally small, light-weight and effective. The combined housing and insert means provides shielding for the film against unwanted radiation from deposited alpha-emitting particles and protects the film from physical contamination.

11 Claims, 13 Drawing Figures

INVENTORS:
HENRY WARD ALTER
DANIEL B. LOVETT

BY: *Sam E. Laub*
ATTORNEY

ALPHA PARTICLE DOSIMETER

BACKGROUND OF THE INVENTION

A great deal of attention is being directed toward the problems of measuring and minimizing radiation hazards for personnel working in environments where the atmosphere may contain appreciable quantities of radioactive materials, such as uranium mines.

One of the potential hazards in uranium mining is the possible presence of radon gas and radon daughters in the atmosphere. Radon-222 is a radioactive gas which emanates from uranium ore. It is a member of the radioactive series which begins the uranium and ends with stable lead-206. Radon-220 or thoron is another form of radon gas which arises from thorium-232. Radon-222 has a half-life of 3.82 days and radon-220 has a half-life of 56 seconds. Both of these gases emit alpha particles as they decay into daughter products in their respective radioactive series. Radon-222 (hereinafter "radon") decays through a chain of daughter products which are members of the uranium radioactive series. The radioactive daughter products of immediate interest are radium-A (polonium-218, half-life 3.05 minutes), radium-B (lead-214, half-life 26.8 minutes), radium-C (bismuth-214, half-life 19.7 minutes), and radium-C' (polonium-214, half-life 164 microseconds). Radon, radium-A and radium-C' emit alpha particles when they decay, and radium-B and radium-C emit beta and gamma radiation upon decay. Radon and its alpha-emitting daughters, radium-A and radium-C', are of specific interest as possible health hazards to miners and other personnel who work in atmospheres containing above-normal concentrations of radon.

The problem of radiation exposure arising from breathing a radon-containing atmosphere is extensively discussed in a booklet entitled "Control of Radon and Daughters in Uranium Mines Calculations on Biological Effects" published in 1957 by the U. S. Department of Health, Education and Welfare (Public Health Service Publication No. 494). Recent investigations supplementing the information in this booklet suggest a higher than normal incidence of lung cancer among uranium ore miners possibly due to alpha radiation from radon inhalation and the retention of alpha-emitting radon daughters in the lungs and other tissues. It is thus important to monitor the atmosphere and work spaces such as uranium mines which may have an above-normal concentration of radon and radon daughter products (and hence alpha radiation) due to the presence of large quantities of uranium bearing materials.

In the past, various electronic instruments have been used to detect radon. Such equipment is expensive, bulky, usually requires trained operators, and may require special sample collection techniques. Since these devices are large and expensive, they are used only at widely spaced locations in a uranium mine. The concentration of radon gas may vary appreciably from point to point in the mine depending upon variations in the concentration of uranium ore. Thus, these widely scattered detectors will not give an accurate picture of the radon gas inhaled by individual miners at different locations in the mine.

Attempts have been made to provide smaller less expensive detection equipment using photographic film. Photographic film is useful since the light-sensitive emulsion of the film will record tracks of alpha particles emitted by radon and some of its daughters. Such film, however, must be packaged in light-tight containers and must be processed using darkroom techniques. Further photographic film has latent image fading of the tracks which limits the useful exposure period to a few months, depending upon the humidity and temperature of the environment in which it is used. Photographic film is thus inconvenient and relatively expensive to use.

Another problem with photographic film in certain applications for detecting radiation is that it is non-selectively sensitive to any of the many different kinds of energetic particles and electromagnetic radiation. Most films are directly sensitive to alpha and beta particles, and are also affected by neutrons, X-ray and gamma radiation, and the like, as photoelectrons and recoil protons which form track images are produced in the sensitive emulsion of the film by this kind of bombardment.

One technological development which is selectively sensitive to alpha radiation is "track-registration" film and the record of damage tracks formed in this film from incident alpha radiation is developed by a known chemical etching process. The track registration film is a homogeneous, solid-state detector material which may be a non-crystalline substance such as inorganic glass or a polymeric plastic. The detector material is exposed to irradiation by charged particles such as alpha radiation, and damage tracks are created in the material by local alteration of the material structure along the particle trajectories. The damage tracks are then enlarged and made visible by application of a reagent in a chemical etching process which preferentially attacks the altered material along the damage track at a faster rate than it attacks the undamaged material around the track. Certain parameters for using track-registration materials sensitive to alpha radiation such as cellulose plastics must be observed in order to have an accurate record of the alpha radiation from exposure to radon and radon daughter products.

Thus, there is a continuing need for a simple and inexpensive device which will permit the measurement of radon in the air inhaled by individual miners with greater accuracy.

OBJECTS OF THE INVENTION

It is, therefore, an object of this invention to provide a radon dosimeter overcoming the above-noted problems.

Another object of this invention is to provide a simple light-weight radon dosimeter of improved reliability.

It is still another object of this invention to provide a radon dosimeter utilizing track-registration materials which shields said materials from radiation from radon daughters deposited on the surfaces of the dosimeter and protects said materials from non-radiation related contamination.

Still a further object of this invention is to provide a radon dosimeter in which the detection material may be more conveniently removed and replaced.

SUMMARY OF THE INVENTION

The above objects and others are accomplished in accordance with this invention by providing a radon dosimeter including a housing and an insert means fitting into the housing for holding track-registration materials. The dosimeter is adapted to be mounted on a hat or other head gear in a position whereby the air near that inhaled by the wearer is continually monitored. The housing is adapted to be secured to the hard-hat or other head gear and the removable insert means can be locked into the housing. An easily operable fastening means is provided to hold the insert means securely in the housing while permitting easy unfastening when desired. The assembled housing and insert means combine to shield the track-registration material from radiation from radon daughters deposited on the surface of the housing or insert means. In addition, the track-registration material is protected against contamination such as from handling by the person using the dosimeter and by deposition of particulate material present in the environment in which the dosimeter is used.

BRIEF DESCRIPTION OF THE DRAWINGS

Details of the invention, and of a preferred embodiment thereof, will be further understood upon reference to the drawings, wherein.

DETAILED DESCRIPTION OF THE INVENTION

Figure 1:
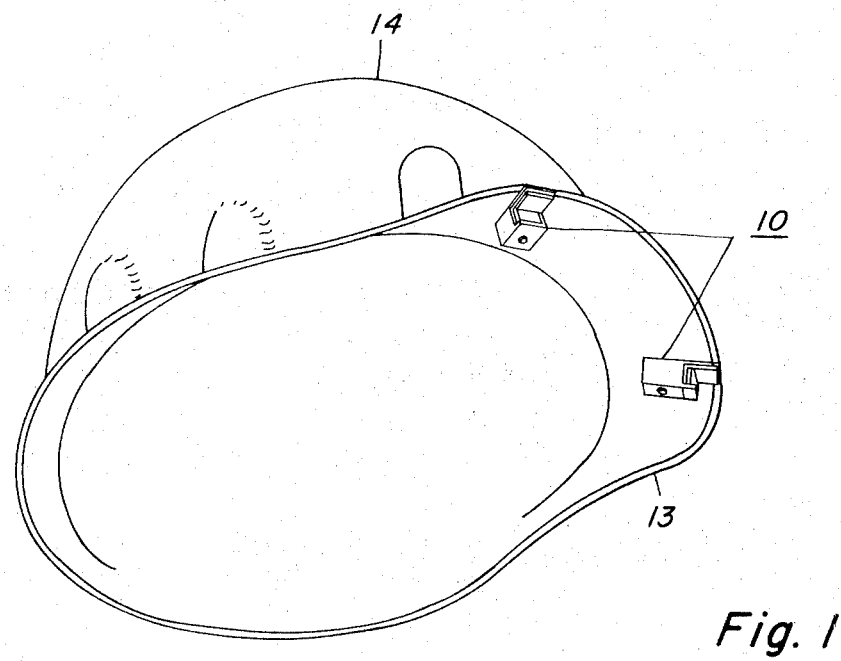
FIG. 1 is a view of one embodiment of the radon dosimeter of this invention secured to a typical hard-hat.
Figure 2:
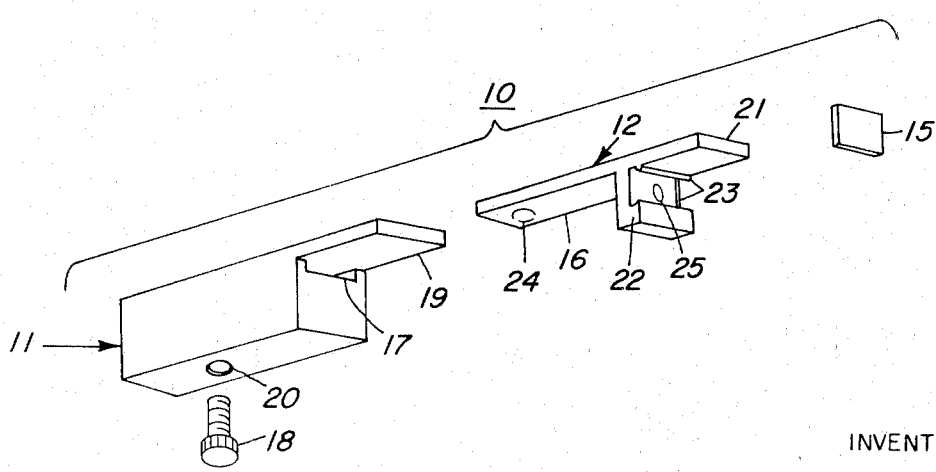
FIG. 2 is an isometric exploded view of the dosimeter with the housing, the insert means and the track-registration film which make up the radon dosimeter of this invention.
Figure 3:
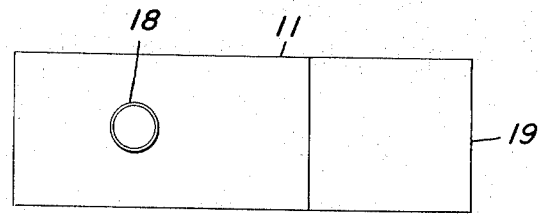
FIG. 3 is a bottom view of the housing used in the dosimeter.
Figure 4:
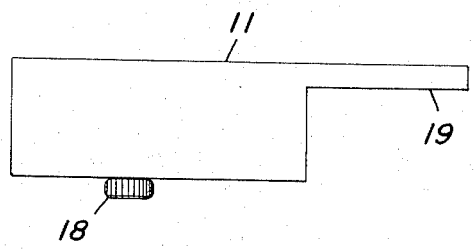
FIG. 4 is a front elevation view of the housing used in the dosimeter.
Figure 5:
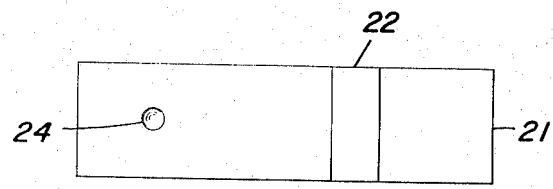
FIG. 5 is a plan view of the insert means used in the dosimeter.
Figure 6:
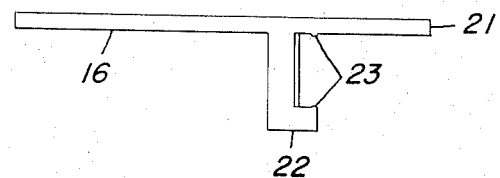
FIG. 6 is a front elevation view of the insert means used in the dosimeter.
Figure 7:
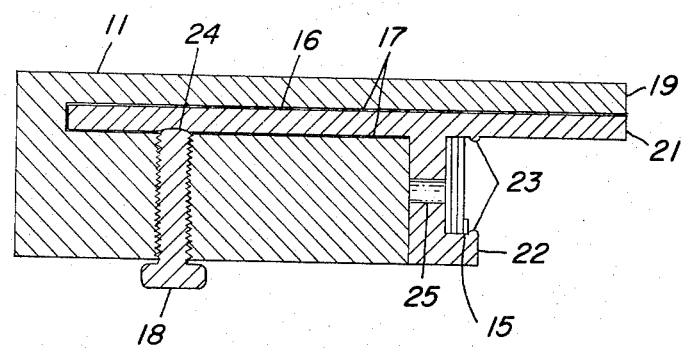
FIG. 7 is a longitudinal section of the assembled dosimeter taken at about the middle of the dosimeter.
Figure 8:
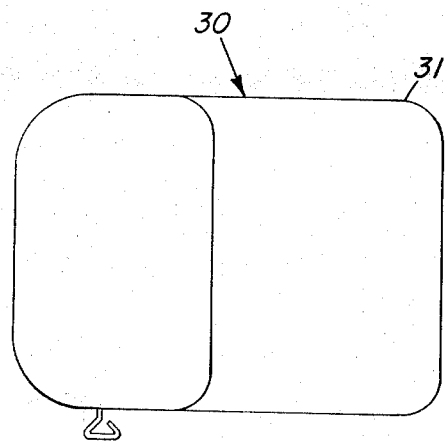
FIGS. 8–13 present another embodiment of the dosimeter of this invention with FIGS. 8, 9 and 10 being respectively a plan, a front and a sectional end view of the housing and FIGS. 11, 12 and 13 being respectively a plan, a front and an end view of the insert means.
Figure 10:
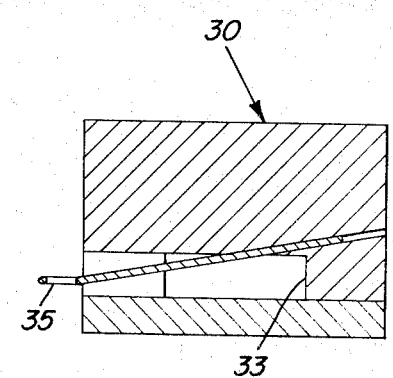

Referring to FIGS. 1 and 2, there is seen a radon dosimeter generally designated 10 which includes a piece of track-registration material 15, a housing 11 and an insert means 12, as further described below. The radon dosimeter 10 is shown fastened to the under side of the brim 13 of a typical protective helmet 14 or "hard hat", such as worn by miners. Radon dosimeter 10 is close to, but spaced from, the forehead of the person wearing the helmet 14. The housing 11 can be permanently attached to the helmet 14 preferably with the tip of the housing 11 flush with the edge of the helmet 14. The attachment can be by adhesives such as glue or epoxy-base adhesives as shown in FIG. 1 or by clamping means or magnetic means. Multiple dosimeters 10 can be attached to the helmet 14 such as shown in FIG. 1 where two dosimeters are attached to the helmet 14. The dosimeter is preferably positioned with insert means 12 pointing away from helmet 14 with housing 11 mounted closer to the person wearing the helmet 14 than insert means 12. In this manner, the track-registration material 15 is held in a position so that it is contacted by incident alpha radiation in the same manner which the person wearing the hat is contacted. The dosimeter is also preferably mounted within about six to about twelve inches of the face of the person wearing the helmet so that the dosimeter is exposed to (or "sees") the air the person breathes. As shown in FIG. 1, the dosimeter is mounted so that it does not interfere with the vision of the person wearing the helmet. The dosimeter 10 on the helmet 14 is also generally protected from contact with mud, water, dust and particles to prevent mechanical damage and minimize the deposition of alpha-emitting materials on the track-registration film 15.

The dosimeter is also located and designed so that alpha radiation from plated-out radon daughters on solid surfaces cannot register on the track-registration film. To accomplish this, the track-registration film is spaced from the adjacent surfaces a distance greater than the transit range of alpha particles in air, which is generally about 7 to about 10 centimeters. Further the dosimeter should be readily washable to remove alpha-bearing dust at the end of each exposure to an alpha radiation environment. The dosimeter is readily adaptable as shown in FIG. 1 to be mounted on a helmet which is the universal and standard article commonly worn by all personnel entering uranium mines.

The track-registration film will not register the tracks of the alpha particle if the alpha particle energy exceeds a certain value when it enters the film. The initial energy of the alpha particles emitted from uranium, radium, radon, radon daughters and the thorium series is greater than the threshold registration energy of the track-registration films. Thus alpha particles originating very close to the film surface will enter the track-registration film with energies too great to produce etchable tracks.

FIG. 2 shows an exploded view of the dosimeter unattached to any helmet and FIGS. 3–7 present other views of the dosimeter showing the components and their arrangement when assembled. The tongue 16 of insert means 12 is adapted to be inserted into the support slot 17 of housing 11 with fastening means 18 (here in the form of a screw with alternatives including a pin, a spring, a clip, a wire, etc.) fitting into opening 28 in the housing 11 serving to secure the tongue 16 of insert means 12 within the support slot 17 of housing 11. Housing 11 has a protruding lip 19 the tip of which preferably can be mounted flush with the edge of the brim 13 of a helmet 14.

The insert means (insert) 12 has an overhanging portion 21 which serves to protect the track-registration film 15 and groove means 22 with lips 23 holding the film 15 in position. A receiving means in the form of an opening 24 is adapted to receive screw 18 locking insert means 12 into housing 11. Groove means 22 can be provided with an opening 25 so that film 15 can be punched out of groove means 22. The components of the dosimeter are designed so that alpha radiation from plated-out radon daughter products on the solid surfaces cannot register on the film. The solid surfaces adjacent to the film 15 are close enough so that alpha energy from the daughter products exceed the threshold energy needed for formation of damage tracks in the film. Other surfaces such as the helmet, ears, clothing, etc., cannot be closer than the maximum range of radium-C' at the altitude of the mine. The insert means 12 can have identifying writing thereon such as a name and serial number written or inscribed on the surface for identification purposes.

Figure 9:
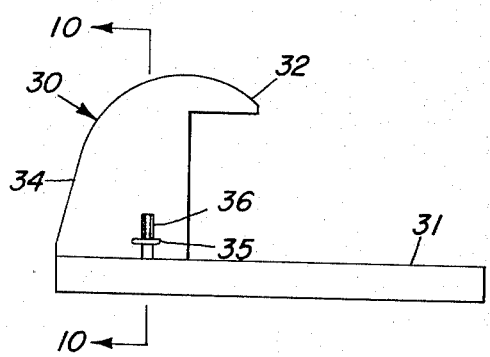
Figure 12:
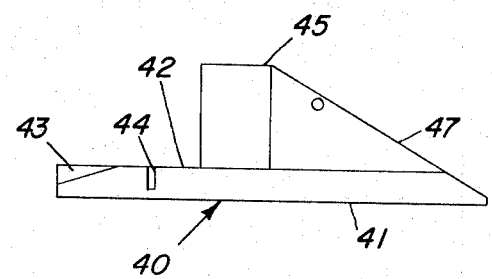
Figure 11:
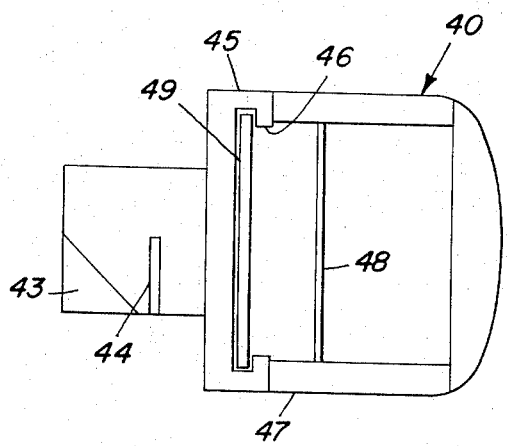
Figure 13:
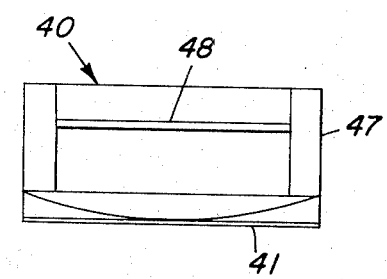

Another embodiment of the dosimeter of this invention is presented in FIGS. 8-13 in which the housing generally designated 30 has a protruding lip 31, a canopy portion 32, and a support slot 33. A spring lock (wire) or fastening means 35 is located in an opening 36 in block portion 34 so that the spring lock 35 is naturally in a position at the end of opening 36 as shown in FIG. 9 unless manually raised toward the opposite end of slot 36. In this position a portion of spring lock 35 is visible in slot 33. The insert means generally designated 40 has a base plate 41 with a tongue 42 having a sloped portion 43 and a slot (receiving means) 44 which receives spring lock (wire 35) in a tight connection when the tongue 42 of insert means 40 is inserted into slot or opening 33 in the housing 30. Groove means 45 with lips 46 holds a piece of track-registration film 49. Slats 47 slope from groove means 45 to the tip of base plate 41 and hold holding means (wire) 48 which serves as a grasping device aiding in the removal of insert means 40 from housing 30 when spring lock 35 is manually raised to the other end of slot 36 from the position of spring lock 35 shown in FIG. 9.

The design of the holder lends itself to be molded from plastic materials including polycarbonates such as Lexan⁺ (⁺trademark of General Electric Company). The dosimeter is small, light and protective for the track-registration film and provides maximum geometry for radon detection with a minimum of plate-out problems. The track-registration material is preferably a cellulose nitrate film of 0.040 inch thickness. The overall size of the dosimeter can be very small with a representative width in the range of about ½ to about 2 inches, a representative length of about 1 to about 2 inches, and a representative height of about ½ to about 1 inch.

At suitable time intervals the insert means 12 can be removed from the housing 11 and the film 15 can be removed from insert means 12 and replaced with fresh film 15. At suitable time intervals the insert means 40 can be removed from the housing 30 and the film 49 can be removed from insert means 40 and replaced with fresh film 49. The exposed film is then developed by etching such as the etching process described in U.S. Pat. No. 3,415,993 to reveal the amount of alpha radiation recorded.

Other modifications and ramifications of the present invention will occur to those skilled in the art upon reading the description of this invention. These are intended to be included within the scope of this invention as defined in the following claims.

What is claimed is:

1. An alpha particle dosimeter for recording alpha radiation comprising, in combination,
   a. a housing having
      i. a support slot capable of receiving an inserted tongue,
      ii. fastening means for locking the inserted tongue into the housing and
      iii. a protruding lip on the housing; and
   b. an insert means having
      i. a tongue capable of being inserted into the support slot of the housing and the tongue having receiving means for receiving the fastening means of the housing to form a connection and
      ii. groove means capable of receiving and holding a piece of track-registration film so that one face of the film is substantially exposed to the atmosphere.

2. The dosimeter of claim 1 in which a piece of track-registration film is inserted into the groove means.

3. The dosimeter of claim 2 in which the track-registration film is cellulose nitrate.

4. The dosimeter of claim 1 in which the housing is fastened to a brim of a helmet.

5. The dosimeter of claim 1 in which the housing and insert means are comprised of plastic.

6. The dosimeter of claim 5 in which the plastic is a polycarbonate.

7. The dosimeter of claim 1 in which the groove means has an opening to enable removing an inserted film therefrom.

8. The dosimeter of claim 1 in which the insert means has identifying writing thereon.

9. The dosimeter of claim 1 in which the fastening means is a bolt threaded in the housing and the receiving means in the tongue is an opening.

10. The dosimeter of claim 1 in which the fastening means is a spring lock in the housing and the receiving means in the tongue is a slot.

11. The dosimeter of claim 1 wherein a track-registration film is psoitioned in the groove means such that alpha radiation emitted by radioactive particles deposited on the surface of components of the dosimeter cannot register on the track-registration film.

* * * * *

UNITED STATES PATENT OFFICE
CERTIFICATE OF CORRECTION

Patent No. 3,783,292    Dated 1 January 1974

Inventor(s) H. W. Alter/D. B. Lovett

It is certified that error appears in the above-identified patent and that said Letters Patent are hereby corrected as shown below:

Column 4, line 1, "which" should be --as--; and line 45, "28" should be --20--. Claim 11, line 2, "psoitioned" should be --positioned--.

Signed and sealed this 10th day of December 1974.

(SEAL)
Attest:

McCOY M. GIBSON JR.       C. MARSHALL DANN
Attesting Officer      Commissioner of Patents